United States Patent
Zhao

(10) Patent No.: US 12,057,953 B2
(45) Date of Patent: Aug. 6, 2024

(54) STANDBY LAYOUT FOR ONLINE MEETINGS

(71) Applicant: Cisco Technology, Inc., San Jose, CA (US)

(72) Inventor: Qiujun Zhao, Hangzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/977,252

(22) Filed: Oct. 31, 2022

(65) Prior Publication Data

US 2024/0146558 A1    May 2, 2024

(51) Int. Cl.
*H04L 12/18* (2006.01)

(52) U.S. Cl.
CPC ...... H04L 12/1822 (2013.01); H04L 12/1818 (2013.01)

(58) Field of Classification Search
CPC .......................... H04L 12/1822; H04L 12/1818
See application file for complete search history.

(56) References Cited

U.S. PATENT DOCUMENTS

| | | | |
|---|---|---|---|
| 7,734,802 B1 | 6/2010 | Gay et al. | |
| 8,091,029 B1 | 1/2012 | Gay et al. | |
| 10,187,435 B2 | 1/2019 | Yin et al. | |
| 10,505,998 B1 | 12/2019 | Ackerman et al. | |
| 11,637,877 B1 * | 4/2023 | Zhu | H04L 65/403 |
| | | | 348/14.03 |
| 2006/0067251 A1 * | 3/2006 | Hagendorf | H04L 47/762 |
| | | | 370/230.1 |
| 2007/0067387 A1 * | 3/2007 | Jain | G06Q 10/10 |
| | | | 709/204 |
| 2011/0271212 A1 * | 11/2011 | Jones | H04M 3/567 |
| | | | 715/753 |
| 2014/0003450 A1 * | 1/2014 | Bentley | H04N 7/15 |
| | | | 370/468 |
| 2014/0068463 A1 | 3/2014 | Kay et al. | |

(Continued)

OTHER PUBLICATIONS

Microsoft, Office Support, "Produce a live event using Teams," https://support.microsoft.com/en-us/office/produce-a-live-event-using-teams-591bd694-121d-405c-b26d-730315e45a22, retrieved Sep. 20, 2022, 11 pages.

(Continued)

*Primary Examiner* — Raqiul A Choudhury
(74) *Attorney, Agent, or Firm* — Edell, Shapiro & Finnan, LLC

(57) ABSTRACT

A selection to activate a standby layout during the online meeting is received from a user device associated with a host of an online meeting. The online meeting including the host and one or more participants. The standby layout is provided for display on the user device associated with the host. The standby layout is populated with standby content based on selections from the host and one or more content streams associated with the standby content are transmitted to the host and the one or more participants. A selection is received from the host to synchronize the standby layout as a current layout for the online meeting for the one or more participants and the standby layout is broadcast to the one or more participants for display as the current layout for the online meeting in response to receiving the selection.

20 Claims, 5 Drawing Sheets

(56) References Cited

U.S. PATENT DOCUMENTS

| | | | |
|---|---|---|---|
| 2014/0267572 A1* | 9/2014 | Bright-Thomas | H04N 19/30 348/14.09 |
| 2015/0149929 A1 | 5/2015 | Shepherd et al. | |
| 2021/0385263 A1* | 12/2021 | Churchill | G06F 3/0482 |

OTHER PUBLICATIONS

Wiki—OBS Studio Overview, "OBS Open Broadcaster Software," OBS Studio Overview, https://obsproject.com/wiki/OBS-Studio-Overview, retrieved Sep. 6, 2022, 18 pages.
Agarwal, S., Wordle Today, "YouTube is testing an Add to Queue feature. Here's how to try it," How to Enable YouTube's New Add to Queue Option | Digital Trends, https://www.digitaltrends.com/web/youtube-add-to-queue/, Aug. 29, 2019, 13 pages.
Webex Meetings, Webex for Service Providers, Webex Webinars, Webex App, "Breakout sessions in Webex Meetings and Webex Webinars," https://help.webex.com/en-us/article/nroo6fs/Breakout-sessions-in-meetings-and-webinars, retrieved Aug. 24, 2022, 7 pages.
Webex Events (Classic), "Conduct a Practice Session in Cisco Webex Events (Classic)," Release WBS41, WBS40, https://help.webex.com/en-us/article/npxgiei/Conduct-a-Practice-Session-in-Cisco-Webex-Events-(Classic), Jul. 29, 2021, 3 pages.
Alam, N. et al., Technical Disclosure Commons, "Controlling the Distribution of Multiple Streams in a Video Collaboration Environment," https://www.tdcommons.org/dpubs_series/4635/, Oct. 2021, 10 pages.
Youtube, OBS Studio Tutorial: Studio Mode, Improve Work Performance | Grammarly Makes Writing One Click Simpler, https://www.youtube.com/watch?v=5xFA4zClptA, Mar. 16, 2016, 4 pages.

* cited by examiner

```
                                    300

┌─────────────────────────────────────────────────────────────────┐
    │   RECEIVING, FROM A USER DEVICE ASSOCIATED WITH A HOST OF AN    │
    │ ONLINE MEETING, A SELECTION TO ACTIVATE A STANDBY LAYOUT DURING │── 310
    │   THE ONLINE MEETING, THE ONLINE MEETING INCLUDING THE HOST AND │
    │                  ONE OR MORE PARTICIPANTS                       │
    └─────────────────────────────────────────────────────────────────┘
                                    │
                                    ▼
    ┌─────────────────────────────────────────────────────────────────┐
    │      PROVIDING THE STANDBY LAYOUT FOR DISPLAY ON THE USER DEVICE│── 320
    │                   ASSOCIATED WITH THE HOST                      │
    └─────────────────────────────────────────────────────────────────┘
                                    │
                                    ▼
    ┌─────────────────────────────────────────────────────────────────┐
    │  POPULATING THE STANDBY LAYOUT WITH STANDBY CONTENT BASED ON    │── 330
    │                  SELECTIONS FROM THE HOST                       │
    └─────────────────────────────────────────────────────────────────┘
                                    │
                                    ▼
    ┌─────────────────────────────────────────────────────────────────┐
    │   TRANSMITTING ONE OR MORE CONTENT STREAMS ASSOCIATED WITH THE  │── 340
    │   STANDBY CONTENT TO THE HOST AND THE ONE OR MORE PARTICIPANTS  │
    └─────────────────────────────────────────────────────────────────┘
                                    │
                                    ▼
    ┌─────────────────────────────────────────────────────────────────┐
    │     RECEIVING A SELECTION FROM THE HOST TO SYNCHRONIZE THE      │
    │  STANDBY LAYOUT AS THE CURRENT LAYOUT FOR THE ONLINE MEETING    │── 350
    │              FOR THE ONE OR MORE PARTICIPANTS                   │
    └─────────────────────────────────────────────────────────────────┘
                                    │
                                    ▼
    ┌─────────────────────────────────────────────────────────────────┐
    │    BROADCASTING THE STANDBY LAYOUT TO THE ONE OR MORE           │
    │ PARTICIPANTS FOR DISPLAY AS THE CURRENT LAYOUT FOR THE ONLINE   │── 360
    │     MEETING IN RESPONSE TO RECEIVING THE SELECTION              │
    └─────────────────────────────────────────────────────────────────┘

FIG.3
```

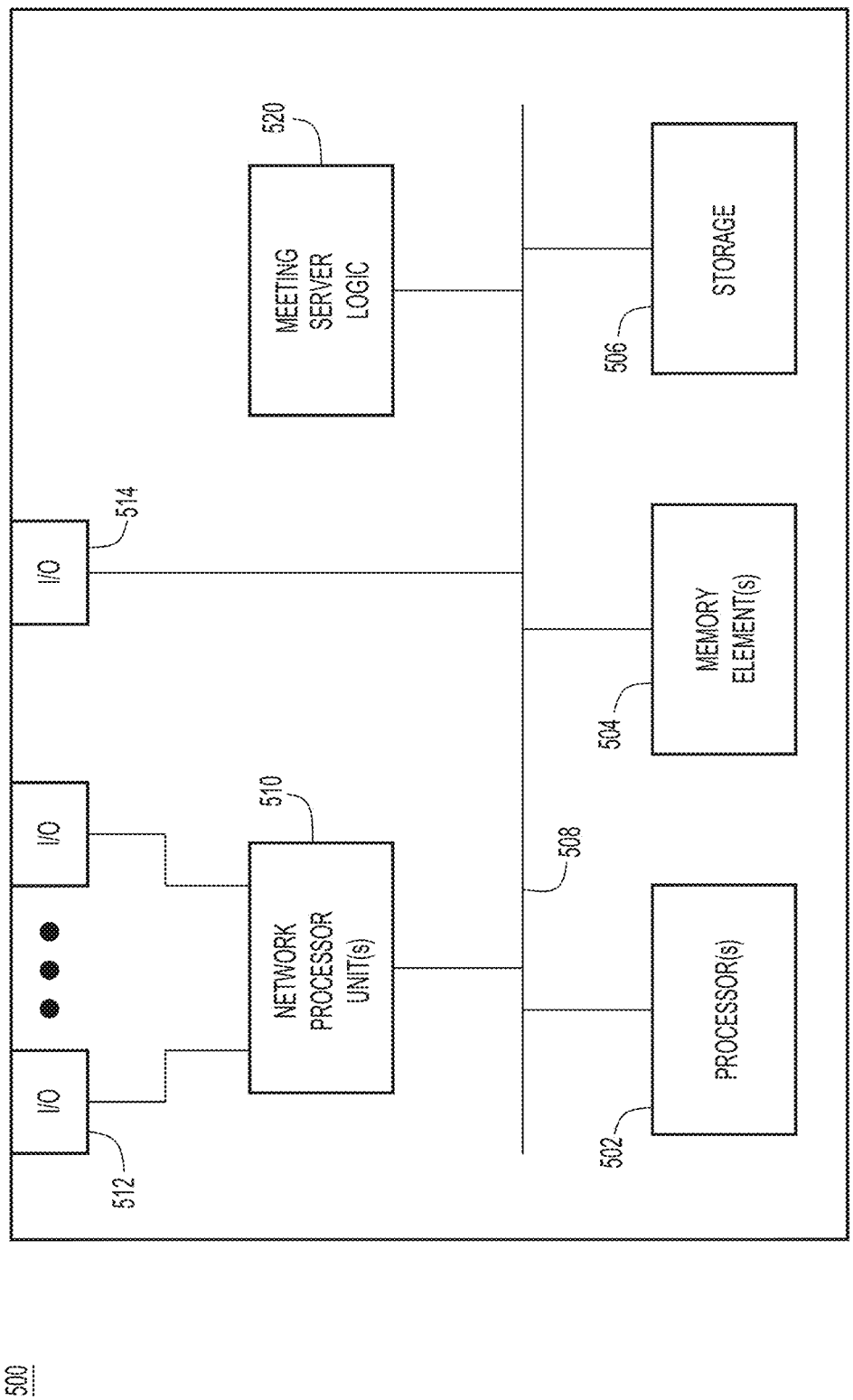

STANDBY LAYOUT FOR ONLINE MEETINGS

TECHNICAL FIELD

The present disclosure relates to online video meetings/conferences.

BACKGROUND

A host of an online meeting may arrange a stage layout for the online meeting by adding content or video feeds of participants to the stage layout. When the host synchronizes the stage layout with the participants in the online meeting, the participants see the stage layout with the content and the video feeds of the participants chosen by the host. When new content is presented in the stage layout, there may be a delay between a time when the host synchronizes the stage layout and a time when the participants see the content. In addition, when a meeting topic changes, the host may require time to clear the current stage layout and prepare a new stage layout.

BRIEF DESCRIPTION OF THE DRAWINGS

FIG. 3 is a flow diagram illustrating a method of providing a layout stage view as a current stage view, according to an example embodiment.

FIG. 5 is a hardware diagram of a computer device that may be configured to perform the meeting server operations involved in populating and synchronizing a standby layout for an online meeting, according to an example embodiment.

DETAILED DESCRIPTION

Overview

Figure 1:
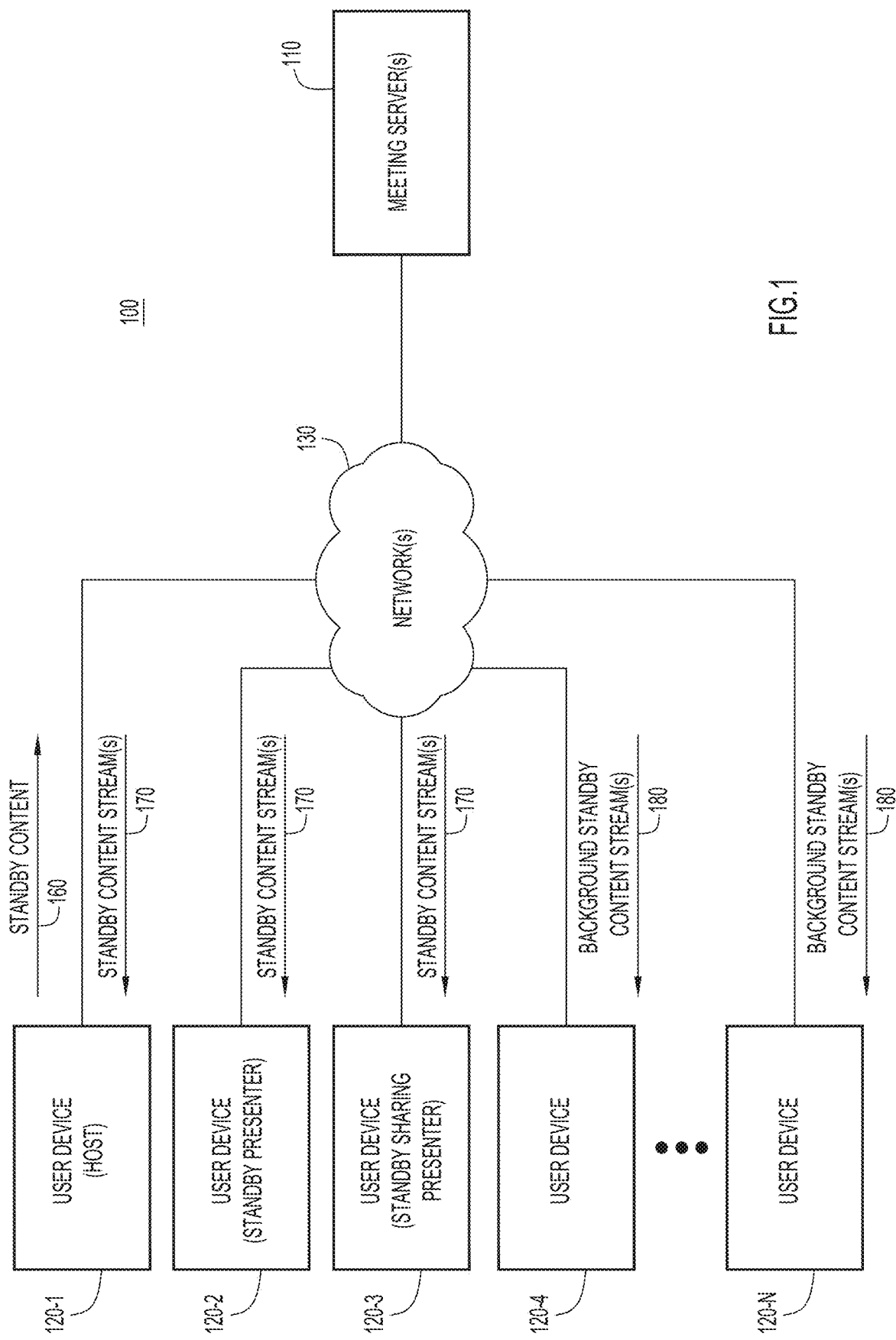
FIG. 1 is a block diagram of an online video conference/meeting system configured to support providing a standby layout for online meetings, according to an example embodiment.

In one embodiment, a method is provided for broadcasting a standby stage layout to participants of an online meeting for display as the current layout for the online meeting. The method includes receiving, from a user device associated with a host of an online meeting, a selection to activate a standby layout during the online meeting, the online meeting including the host and one or more participants; providing the standby layout for display on the user device associated with the host; populating the standby layout with standby content based on selections from the host; transmitting one or more content streams associated with the standby content to the host and the one or more participants; receiving a selection from the host to synchronize the standby layout as a current layout for the online meeting for the one or more participants; and broadcasting the standby layout to the one or more participants for display as the current layout for the online meeting in response to receiving the selection.

Example Embodiments

Online meetings may be used to present material by sharing content from one or more participants' user devices. In some cases, different participants in the online meeting may be responsible for presenting different aspects of the material during the online meeting. A host may create a "stage" in which live video feeds of participants/presenters and/or content are moved to a central area and arranged within the area. When the host synchronizes ("syncs") the stage for all attendees of the meeting to view, the attendees see the feeds of the participants and/or the content arranged by the host.

If the host moves new content, such as a new video, to the stage view, attendees may experience a delay between when the host syncs the stage and when the video appears. During the delay, the attendees may see an avatar or another image before the video is available. The delay may cause a disruption in the flow of the meeting. In addition, when a new topic is introduced, the host may need some time to clear the current synced stage and prepare a new stage. For example, the host may need to remove the live video streams of the current presenters from the stage and add new content and/or live video streams of new presenters. Arranging a new stage in a short period of time may be difficult for the host. In addition, the attendees of the meeting experience an additional delay while the new stage is being set up.

Presented herein are techniques for seamlessly switching to a new stage view by providing a standby stage layout. In accordance with embodiments provided herein, a host or cohost of an online meeting may view a standby stage in conjunction with the current stage (e.g., next to the current stage, in a window near the current stage, etc.) and may arrange the standby stage while other participants of the online meeting are viewing the current stage. The host or cohost may populate the standby stage with video streams of presenters (e.g., by dragging and dropping the presenters from the filmstrip to the stage) and/or other content (e.g., videos, pictures, content shared by the host, content shared by other participants, etc.).

When the standby stage is populated with content (e.g., participant video feeds and/or other content), participants of the online meeting may receive content streams associated with the content. If a participant is associated with the content (e.g., a participant's video feed has been moved to the standby stage, the participant is sharing content on the standby stage, etc.), the participant may view the content streams and the standby stage. If a participant is not associated with any content in the standby stage (e.g., the participant's video feed has not been moved to the standby stage, the participant is not sharing content on the standby stage, etc.), the participant may receive the content streams in the background and may not be able to view the content streams or the standby stage. When the host selects an option to sync the standby stage, the standby layout is broadcast to the participants of the online meeting for display as the current layout and the participants may view the content streams.

Reference is first made to FIG. 1. FIG. 1 shows a block diagram of a system 100 that is configured to provide online meeting services with a standby stage view. The system 100 includes one or more meeting server(s) 110 and a plurality of endpoint devices 120-1 to 120-N (sometimes referred to herein individually as endpoint device 120 or collectively as endpoint devices 120) that communicate with meeting server(s) 110 via one or more networks 130. The meeting server(s) 110 are configured to provide an online meeting service for hosting a communication session among endpoint devices 120-1 to 120-N.

Each of endpoint devices 120-1 to 120-N may be a tablet, laptop computer, desktop computer, Smartphone, virtual desktop client, virtual whiteboard, or any user device now known or hereinafter developed. Endpoint devices 120-1 to 120-N may have a dedicated physical keyboard or touchscreen capabilities to provide a virtual on-screen keyboard to enter text. Endpoint devices 120-1 to 120-N may also have short-range wireless system connectivity (such as Bluetooth™ wireless system capability, ultrasound communication capability, etc.) to enable local wireless connectivity with a video endpoint device in a meeting room or with other user devices in the same meeting room. Endpoint devices 120-1 to 120-N may store content (e.g., a presentation, a document, images, etc.) for sharing the content with other user devices during an online meeting or communication session. In some embodiments, endpoint devices 120-1 to 120-N may be endpoint devices for facilitating communication with meeting server(s) 110 during the online meeting. Endpoint devices 120-1 to 120-N may additionally connect to user devices (not illustrated in FIG. 1) for sharing content stored on the user devices during the online meeting.

In some cases, endpoint devices 120-1 to 120-N may be videoconference endpoints designed for personal use (e.g., a desk device used by a single user) or for use by multiple users (e.g., a videoconference endpoint in a meeting room). In some embodiments, endpoint devices 120-1 to 120-N may be configured to open content to display or share (e.g., when a digital whiteboard is accessed directly on endpoint device 120).

In the example illustrated in FIG. 1, a user of endpoint device 120-1 may be presenting content during an online meeting. In the example described in FIG. 1, the user of endpoint device 120-1 is a host (e.g., meeting coordinator or cohost) of the online meeting. For example, the host may coordinate or populate a stage for the other participants in the meeting to view. The stage may include shared content (e.g., content shared by the host or another participant of the online meeting), video feeds of the host and/or other participants in the online meeting, videos, pictures, or other content. The host may arrange the content in a particular order or in a particular place on the stage so that when the stage is synced with the participants, the participants see the content arranged in the manner determined by the host. In one embodiment, the host may arrange the stage using endpoint device 120-1 and sync the stage so that all the participants view the stage arranged by the host.

According to embodiments described herein, the host may select an option to activate a standby stage view. For example, the host may select an option on a menu (e.g., a "layout" menu) to activate the standby stage view. When the standby stage view is activated, an empty standby stage view may be displayed on endpoint device 120-1 (e.g., next to the current stage view, on the same display as the current stage view, in a separate window from the current stage view, etc.). The empty standby stage view may additionally be displayed on the endpoint devices of other hosts/cohosts of the online meeting. In one embodiment, the standby stage view may be displayed on the endpoint devices of the other hosts/cohosts automatically. In another embodiment, the standby stage view may be displayed on the endpoint devices of the other hosts/cohosts based on the other hosts/cohosts selecting an option to display the standby stage view.

As shown at 160 in FIG. 1, the host may populate the standby stage view with standby content and an indication of the standby content may be sent to meeting server(s) 110. In one embodiment, the host may select video streams of participants ("standby presenters") in the online meeting to move to the standby stage view. The standby presenters may be participants who will be presenting content when the standby stage is synced as the current stage. In one example, the host may drag the video streams of the presenters from a filmstrip or a current stage view associated with the online meeting to the standby stage view. In another example, the host may move a video feed of a participant to the standby stage by clicking on the video stream of the participant (e.g., in the filmstrip or on the current stage view) and selecting an option to move the video stream of the participant to the standby stage. The host may select the standby presenters for the standby stage view in a number of different ways. When a standby presenter has been moved to the standby stage, the standby presenter may view the standby stage view. For example, a standby stage view including the content populating the standby stage may be presented on an endpoint device 120 associated with the standby presenter (e.g., automatically or based on the standby presenter selecting an option to view the standby stage view).

The host may populate the standby stage view with additional content. For example, the host may populate the standby stage view with content shared by the host, content shared by a participant or standby presenter, videos, graphics, etc. When the standby stage view is populated with content that is to be shared by a participant of the online meeting who is not the host, the participant who is sharing the standby content ("standby sharing presenter") may view the standby stage view (e.g., automatically or based on selecting an option to view the standby stage view). When the standby sharing presenter views the standby stage view, the standby sharing presenter may begin sharing content (e.g., from an endpoint device 120) in the standby stage view. Participants who have been designated standby sharing presenters may share content in the standby stage view and participants who have not been designated as standby sharing presenters (including hosts and cohosts) may not share content in the standby stage view. The standby sharing presenter may share the content before the standby stage view is synced as the current stage view to eliminate or minimize a delay in sharing the content when the standby stage view is synced.

The host may arrange the content within the standby stage view in a particular order. For example, the host may arrange the content so that the video streams of the presenters are on the right side of the standby stage and the shared content is on the left side of the standby stage. In other examples, the host may arrange the content in different ways. When the standby stage view is synced as the current stage view, the participants may view the content in the order that it was arranged by the host.

When content has been added to the standby stage view, a standby content stream for each piece of content is broadcast to the participants in the online meeting. As illustrated in FIG. 1, meeting server(s) 110 may send standby content stream(s) 170 to endpoint devices 120-1 to 120-3 and meeting server(s) 110 may send background standby content stream(s) 180 to endpoint devices 120-4 to 120-N. The standby content stream(s) 170 may be viewed by the participants and the background standby content stream(s) 180 may not be viewed by the participants. Endpoint device 120-1 is associated with a host of the online meeting, endpoint device 120-2 is associated with a standby presenter of the online meeting whose video stream has been moved to the standby stage, and endpoint device 120-3 is associated with a standby sharing presenter who is scheduled to share content on the standby stage. Therefore, the users of endpoint devices 120-1 to 120-3 may view the standby stage view and the standby content stream(s) 170 of the content populating the standby stage.

The users of endpoint devices 120-4 to 120-N have not been moved to the standby stage and are not scheduled to share content on the standby stage. Therefore, the users of endpoint devices 120-4 to 120-N are unable to view the standby stage view. Endpoint devices 120-4 to 120-N still receive the background standby content stream(s) 180 so that there is no delay (or a very small delay) when the host syncs the standby stage view as the current stage view. Meeting server(s) 110 may reduce the bitrate, frame rate, and/or resolution of the background standby content streams(s) 180 being sent to endpoint devices 120-4 to 120-N. For example, meeting server(s) 110 may reduce the bitrate, frame rate, and/or resolution of the background standby content streams(s) 180 to minimize the resources used when transmitting the background standby content stream(s) 180. Since users of endpoint devices 120-1 to 120-3 may view the standby content stream(s) 170, meeting server(s) 110 may send the standby content stream(s) 170 to endpoint devices 120-1 to 120-3 without reducing the bitrate, frame rate, and/or resolution of the standby content stream(s) 170. Although not illustrated in FIG. 1, endpoint devices 120-1 to 120-N additionally receive content stream(s) from content being displayed on a current stage for the online meeting.

The host or cohost of the online meeting may select an option to sync the standby stage view (e.g., by clicking a "sync" button on the standby stage view) and the standby stage view becomes the current stage view for the participants in the meeting. When the standby stage view becomes the current stage view, the standby sharing presenter becomes the sharing presenter, the content shared by the sharing presenter is viewable by all participants in the online meeting, and the video feeds of the standby presenters appear for view on the stages of the participants. Because the participants have been receiving standby content stream(s) 170 or background standby content stream(s) 180, a delay in receiving the content stream(s) may be virtually nonexistent when the standby stage is synced as the current stage. When the standby stage is synced as the current stage, meeting server(s) 110 may transmit the content stream(s) to all participants without a reduced bitrate, frame rate, and/or resolution.

Although the standby presenters and the standby sharing presenters may view the standby stage view, the standby presenters and the standby sharing presenters may not sync the standby stage view for the online meeting. For example, the standby presenters and the standby sharing presenters may not be presented with an option to sync the standby stage view (e.g., there may not be a "sync" button or the "sync" button may not be selectable on the standby stage view shown to the standby presenters and the standby sharing presenters).

By populating and arranging a standby stage view, a host may prepare a stage for a new topic during an online meeting without participants in the online meeting waiting for the new stage to be prepared. In addition, by transmitting the standby content streams and background standby content streams to the participants, a delay in receiving shared content when the standby stage is synced as the current stage is minimized or eliminated. Populating the standby stage provides for a smoother online meeting when switching between different topics or content presented by different participants in an online meeting.

Figure 2:
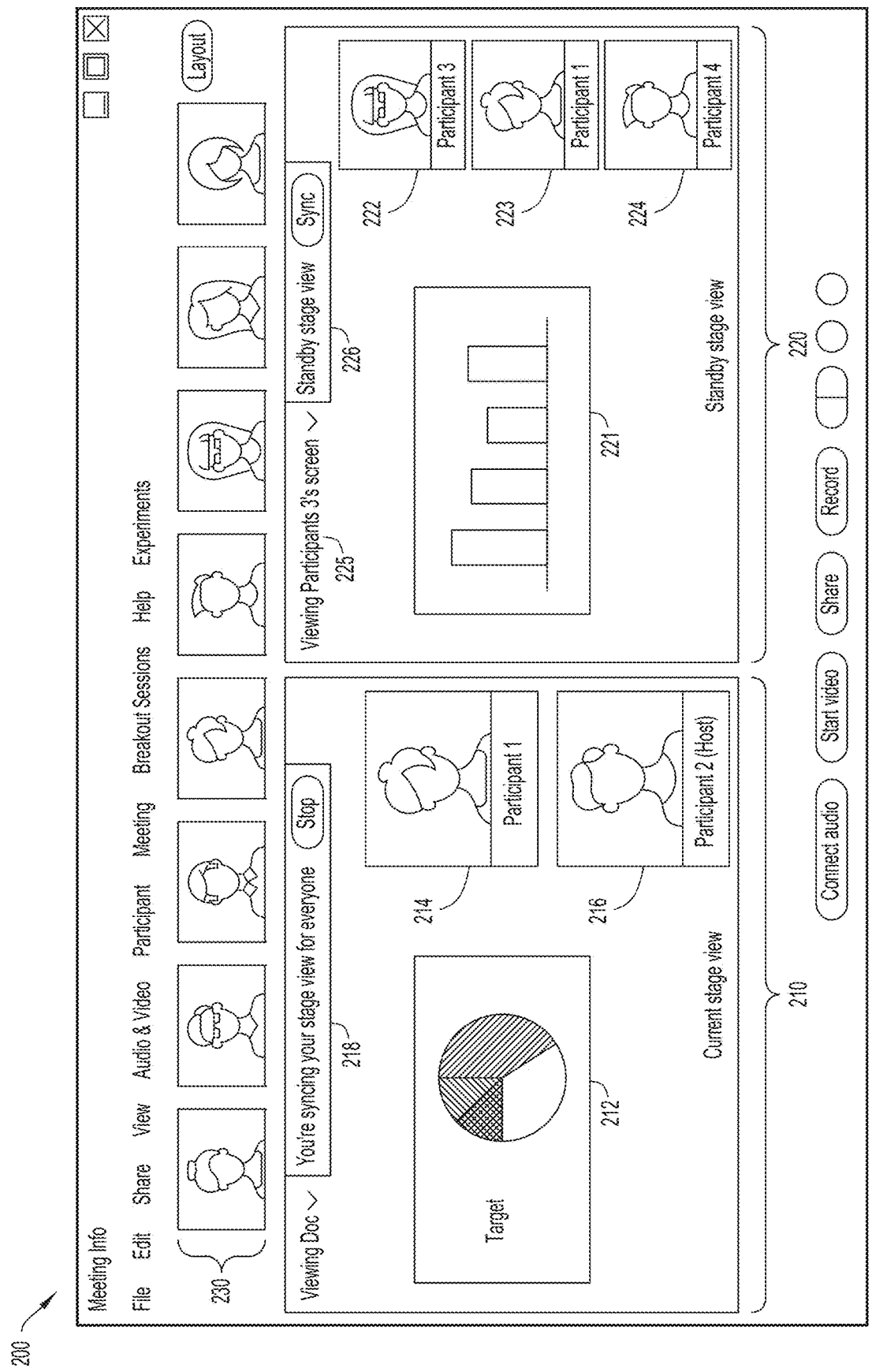
FIG. 2 shows a user interface depicting an example in which a standby stage is viewed next to a current stage view, according to an example embodiment.

Reference is now made to FIG. 2. FIG. 2 illustrates a user interface 200 depicting an example in which a standby stage view is presented next to a current stage view during an online meeting. User interface 200 includes current stage view 210, standby stage view 220, and filmstrip 230.

The example illustrated in FIG. 2 shows a user interface displayed on a user device, such as endpoint device 120-1, of a host of an online meeting. Current stage view 210 includes content 212, a video feed 214 of Participant 1, a video feed 216 of Participant 2 (who is a host of the online meeting), and an indication 218 that says "You're syncing your stage view for everyone" with an option to stop sharing the stage view. Content 212 may be content shared by Participant 1, Participant 2, a different participant in the online meeting, or content that is not shared content (e.g., an image that was uploaded).

In the example illustrated in FIG. 2, Participant 2 has chosen an option to activate standby stage view 220. Participant 2 (or another host) has populated standby stage view 220 with standby content. In this example, standby stage view includes standby shared content 221, a video feed 222 of Participant 3, a video feed 223 of Participant 1, and a video feed 224 of Participant 4. Standby stage view 220 also includes an indication 225 that says, "Viewing Participant 3's Screen," which indicates that standby shared content 221 is being shared from a screen associated with Participant 3. Standby stage view 220 additionally includes an indication 226 that stays "Standby stage view" with an option to sync the standby stage view as the current stage view. The option to sync the standby stage view is present because the user interface of FIG. 2 is associated with a host of the online meeting. Although participants associated with the content populating standby stage view 220 (e.g., Participant 1, Participant 3, and Participant 4) are able to view the standby stage view, the option to sync the standby stage view may not be present (or may be present but not selectable) on a standby stage view associated with participants who are not hosts.

The video feed 222 of Participant 3 and the video feed 224 of Participant 4 may have been moved to standby stage view 220 by dragging the video feeds from filmstrip 230. Since the video feed 214 of Participants 1 is shown on the current stage view 210, the video feed 223 of participant may have been moved to the standby stage view 220 from the filmstrip 230 or from the current stage view 210. In other embodiments, the video feeds 222, 223, and 224 may have been populated in standby stage view 220 by selecting a video feed of the participants from filmstrip 230, current stage view 210, or another area (e.g., from a list of participants) and choosing an option to move the video feeds to the standby stage.

As discussed above, the participants in the online meeting, including the participants shown in filmstrip 230 and any participants not shown in filmstrip 230, receive standby content streams associated with video feeds 222-224 and standby shared content 221. Participant 1, Participant 2, Participant 3, and Participant 4 and any hosts or cohosts of the online meeting may view the received standby content streams. Other participants (e.g., participants in the online meeting other than Participant 1, Participant 3, and Participant 4 and other hosts/cohosts) may receive the standby content streams in the background and the standby content streams may be transmitted to the other participants with a reduced bitrate, frame rate, and/or resolution. Because Participant 3 is sharing the standby content in the standby stage view, the participants may receive the standby stream associated with standby shared content 221 from a user device associated with Participant 3.

The participants of the online meeting additionally receive content streams for the content in the current stage view 210. When standby stage view 220 is populated with the content shown in FIG. 2, participants receive content streams associated with content 212 and standby shared content 221 and content streams associated with video feeds of Participant 1, Participant 2, Participant 3, and Participant 4. Because video feed 214 of Participant 1 is on the current stage view 210, even participants who receive the standby content streams in the background will receive a viewable content stream associated with Participant 1.

When the host (e.g., Participant 2) selects an option to sync the standby stage view as the current stage view, the standby stage view becomes the current stage view. In one embodiment, when the standby stage view is synced as the current stage view, participants associated with the standby stage (e.g., Participant 1, Participant 3, and Participant 4) no longer see a standby stage view. When the standby stage view 220 is synced as the current stage view, participants receive a content stream associated with shared content 221 and content streams associated with video feeds 222-224. The participants no longer receive the content streams associated with content 212 or video feed 216 associated with Participant 2.

Since the participants of the online meeting receive the standby content streams associated with video feeds 222-224 and standby shared content 221 when the video feeds 222-224 and standby shared content 221 are populating the standby stage, participants may view the content streams with little or no delay when the standby stage view is synced as the current stage view. Even though participants who are not associated with the standby stage receive the content streams in the background, when the standby stage is synced as the current stage, the participants immediately receive the content streams (e.g., without a reduced bitrate, frame rate, and/or resolution) without delay.

Referring to FIG. 3, FIG. 3 illustrates a method 300 of populating a standby layout for an online meeting with standby content and broadcasting the standby layout as a current layout for the online meeting. Method 300 may be performed by meeting server(s) 110 in combination with endpoint devices 120-1 to 120-N and/or additional devices.

At 310, a selection to activate a standby layout during an online meeting is received from a user device associated with a host of the online meeting. The online meeting includes the host and one or more participants. For example, the host may choose a menu selection to activate a standby layout. At 320, the standby layout may be provided for display on the user device associated with the host. For example, an empty standby layout may be provided for display in conjunction with the current layout for the online meeting.

At 330, the standby layout may be populated with standby content based on selections from a host. For example, the host may select content to populate the standby layout. The content may include video feeds of participants in the online meeting, content shared by participants of the online meeting, or other content. The populated standby layout may be displayed on the user device associated with the host. In some embodiments, the populated standby layout may be displayed on user devices of participants associated with the standby content (e.g., user devices of participants whose video feeds have been moved to the standby layout, user devices of participants who are sharing content on the standby layout, etc.).

At 340, one or more content streams associated with the standby content are transmitted to the host and the one or more participants. For example, content streams associated with video feeds, shared content, and other standby content populating the standby layout are transmitted to the one or more participants of the online meeting. In one embodiment, participants associated with the standby content may view the content streams. In another embodiments, participants who are not associated with the standby content may receive the one or more content streams in the background and may not view the content streams. The participants that receive the content streams in the background may receive the content streams with a reduced bitrate, frame rate, and/or resolution.

At 350, a selection is received from the host to synchronize the standby layout as the current layout for the online meeting for the one or more participants. For example, the host may select a "sync" selection on the standby layout. At 360, the standby layout is broadcast to the one or more participants for display as the current layout for the online meeting in response to receiving the selection. When the standby layout is displayed as the current layout for the online meeting, the one or more participants may view the layout and the content streams associated with the content as the current layout for the online meeting.

Figure 4:
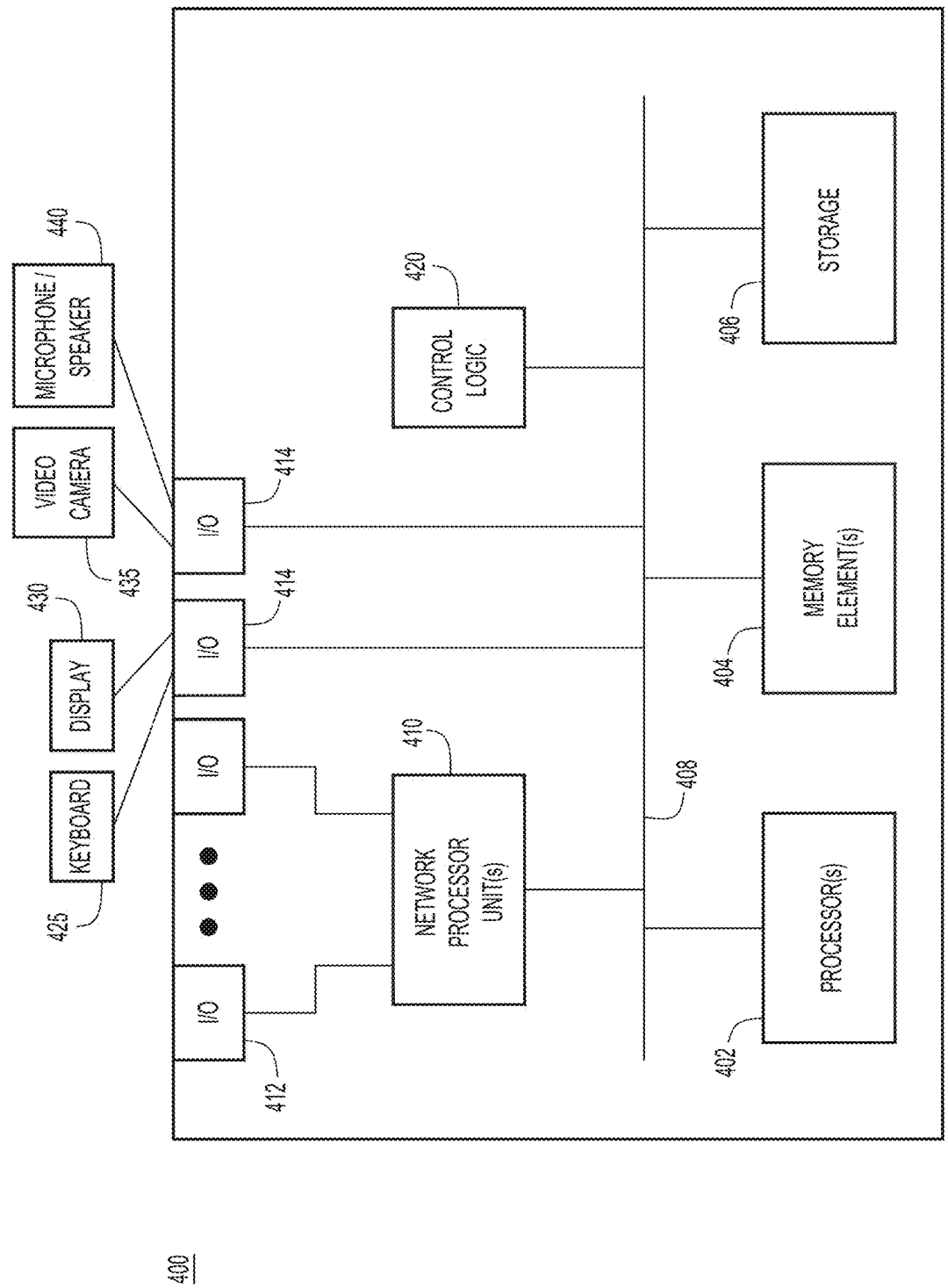
FIG. 4 is a hardware block diagram of a device that may be configured to perform the endpoint device-based operations involved in populating and synchronizing a standby layout for an online meeting, according to an example embodiment.

Referring to FIG. 4, FIG. 4 illustrates a hardware block diagram of a computing/computer device 400 that may perform functions of a video endpoint device or an end device associated with operations discussed herein in connection with the techniques depicted in FIGS. 1-3. In various embodiments, a computing device, such as computing device 400 or any combination of computing devices 400, may be configured as any devices as discussed for the techniques depicted in connection with FIGS. 1-3 in order to perform operations of the various techniques discussed herein.

In at least one embodiment, the computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, any other I/O port(s), and/or antenna(s)/antenna array(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard 425, keypad, a touch screen, and/or any other suitable input and/or output device now known or hereafter developed. This may be the case, in particular, when the computer device 400 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 430 shown in FIG. 4, particularly when the computer device 400 serves as a user device as described herein. Display 430 may have touch-screen display capabilities. Additional external devices may include a video camera 435 and microphone/speaker combination 440. While FIG. 4 shows the display 430, video camera 435 and microphone/speaker combination 440 as being coupled via one of the I/O interfaces 414, it is to be understood that these components may instead be coupled to the bus 408.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

FIG. 5 illustrates a block diagram of a computing device 500 that may perform the functions of the meeting server(s) 110 described herein. The computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and meeting server logic 520. In various embodiments, instructions associated with the meeting server logic 520 is configured to perform the meeting server operations described herein, including those depicted by the flow chart for method 300 shown in FIG. 3.

In one form, a method is provided comprising receiving, from a user device associated with a host of an online meeting, a selection to activate a standby layout during the online meeting, the online meeting including the host and one or more participants; providing the standby layout for display on the user device associated with the host; populating the standby layout with standby content based on selections from the host; transmitting one or more content streams associated with the standby content to the host and the one or more participants; receiving a selection from the host to synchronize the standby layout as a current layout for the online meeting for the one or more participants; and broadcasting the standby layout to the one or more participants for display as the current layout for the online meeting in response to receiving the selection.

In one example, the standby content includes a video feed of at least one participant of the one or more participants. In another example, the standby content includes shared content shared by at least one participant of the one or more participants. In another example, transmitting the one or more content streams includes transmitting the one or more content streams for view by participants associated with the standby content. In another example, transmitting the one or more content streams includes transmitting the one or more content streams without displaying the one or more content streams for participants that are not associated with the standby content. In another example, transmitting the one or more content streams without displaying the one or more content streams includes transmitting the one or more content streams with one or more of a reduced bitrate, reduced frame rate, or reduced resolution. In another example, the method includes providing the standby layout for display on devices of participants associated with the standby content.

In another form, an apparatus is provided comprising: a memory; a network interface configured to enable network communication; and a processor, wherein the processor is configured to perform operations comprising: receiving, from a user device associated with a host of an online meeting, a selection to activate a standby layout during the online meeting, the online meeting including the host and one or more participants; providing the standby layout for display on the user device associated with the host; populating the standby layout with standby content based on selections from the host; transmitting one or more content streams associated with the standby content to the host and the one or more participants; receiving a selection from the host to synchronize the standby layout as a current layout for the online meeting for the one or more participants; and broadcasting the standby layout to the one or more participants for display as the current layout for the online meeting in response to receiving the selection.

In yet another form, one or more non-transitory computer readable storage media encoded with instructions are provided that, when executed by a processor, cause the processor to execute a method comprising: receiving, from a user device associated with a host of an online meeting, a selection to activate a standby layout during the online meeting, the online meeting including the host and one or more participants; providing the standby layout for display on the user device associated with the host; populating the standby layout with standby content based on selections from the host; transmitting one or more content streams associated with the standby content to the host and the one or more participants; receiving a selection from the host to synchronize the standby layout as a current layout for the online meeting for the one or more participants; and broadcasting the standby layout to the one or more participants for display as the current layout for the online meeting in response to receiving the selection.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving, from a user device associated with a host of an online meeting, a selection to activate a standby layout during the online meeting, the online meeting including the host and one or more participants, the standby layout being associated with the online meeting;
providing the standby layout for display on the user device associated with the host, wherein the standby layout is empty prior to being populated with standby content based on selections from the host;
populating the standby layout with standby content associated with the online meeting based on the selections from the host;
transmitting one or more content streams associated with the standby content to the host and the one or more participants;
receiving a selection from the host to synchronize the standby layout as a current layout for the online meeting for the one or more participants; and
broadcasting the standby layout to the one or more participants for display as the current layout for the online meeting in response to receiving the selection from the host to synchronize the standby layout as the current layout for the online meeting.

2. The method of claim 1, wherein the standby content includes a video feed of at least one participant of the one or more participants.

3. The method of claim 1, wherein the standby content includes shared content shared by at least one participant of the one or more participants.

4. The method of claim 1, wherein transmitting the one or more content streams includes transmitting the one or more content streams for view by participants associated with the standby content.

5. The method of claim 1, wherein transmitting the one or more content streams includes transmitting the one or more content streams without displaying the one or more content streams for participants that are not associated with the standby content.

6. The method of claim 5, wherein transmitting the one or more content streams without displaying the one or more content streams includes transmitting the one or more content streams with one or more of a reduced bitrate, reduced frame rate, or reduced resolution.

7. The method of claim 1, further comprising:
providing the standby layout for display on devices of participants associated with the standby content.

8. An apparatus comprising:
a memory;
a network interface configured to enable network communication; and
a processor, wherein the processor is configured to perform operations comprising:
receiving, from a user device associated with a host of an online meeting, a selection to activate a standby layout during the online meeting, the online meeting including the host and one or more participants, the standby layout being associated with the online meeting;
providing the standby layout for display on the user device associated with the host, wherein the standby layout is empty prior to being populated with standby content based on selections from the host;
populating the standby layout with standby content associated with the online meeting based on the selections from the host;
transmitting one or more content streams associated with the standby content to the host and the one or more participants;
receiving a selection from the host to synchronize the standby layout as a current layout for the online meeting for the one or more participants; and
broadcasting the standby layout to the one or more participants for display as the current layout for the online meeting in response to receiving the selection from the host to synchronize the standby layout as the current layout for the online meeting.

9. The apparatus of claim 8, wherein the standby content includes a video feed of at least one participant of the one or more participants.

10. The apparatus of claim 8, wherein the standby content includes shared content shared by at least one participant of the one or more participants.

11. The apparatus of claim 8, wherein, when transmitting the one or more content streams, the processor is further configured to perform operations comprising:
transmitting the one or more content streams for view by participants associated with the standby content.

12. The apparatus of claim 8, wherein, when transmitting the one or more content streams, the processor is further configured to perform operations comprising:
transmitting the one or more content streams without displaying the one or more content streams for participants that are not associated with the standby content.

13. The apparatus of claim 12, wherein, when transmitting the one or more content streams without displaying the one or more content streams, the processor is further configured to perform operations comprising:
transmitting the one or more content streams with one or more of a reduced bitrate, reduced frame rate, or reduced resolution.

14. The apparatus of claim 8, wherein the processor is further configured to perform operations comprising:
providing the standby layout for display on devices of participants associated with the standby content.

15. One or more non-transitory computer readable storage media encoded with instructions that, when executed by a processor, cause the processor to execute a method comprising:
receiving, from a user device associated with a host of an online meeting, a selection to activate a standby layout during the online meeting, the online meeting including the host and one or more participants, the standby layout being associated with the online meeting;
providing the standby layout for display on the user device associated with the host, wherein the standby layout is empty prior to being populated with standby content based on selections from the host;
populating the standby layout with standby content associated with the online meeting based on the selections from the host;
transmitting one or more content streams associated with the standby content to the host and the one or more participants;
receiving a selection from the host to synchronize the standby layout as a current layout for the online meeting for the one or more participants; and
broadcasting the standby layout to the one or more participants for display as the current layout for the online meeting in response to receiving the selection from the host to synchronize the standby layout as the current layout for the online meeting.

16. The one or more non-transitory computer readable storage media of claim 15, wherein the standby content includes a video feed of at least one participant of the one or more participants.

17. The one or more non-transitory computer readable storage media of claim 15, wherein the standby content includes shared content shared by at least one participant of the one or more participants.

18. The one or more non-transitory computer readable storage media of claim 15, wherein transmitting the one or more content streams includes transmitting the one or more content streams for view by participants associated with the standby content.

19. The one or more non-transitory computer readable storage media of claim 15, wherein transmitting the one or more content streams includes transmitting the one or more content streams without displaying the one or more content streams for participants that are not associated with the standby content.

20. The one or more non-transitory computer readable storage media of claim 15, further comprising:
providing the standby layout for display on devices of participants associated with the standby content.

\* \* \* \* \*